3,316,153
VIRUS PURIFICATION
Richard M. Van Frank, Indianapolis, Ind., assignor to Eli Lilly and Company, Indianapolis, Ind., a corporation of Indiana
No Drawing. Filed Mar. 29, 1965, Ser. No. 443,685
10 Claims. (Cl. 167—78)

The present invention relates to the purification and concentration of virus materials. More particularly, it relates to an improved method for the separation of viruses and virus vaccines from dilute and/or crude preparations thereof, whereby the said virus materials are obtained in concentrated and stabilized form.

The propagation of viruses takes place only within growing cells, with the result that virus preparations are contaminated with culture media materials and cell debris, including associated proteinaceous substances. Such materials are undesirable in vaccines, and for this reason a variety of methods have been devised to purify and concentrate virus cultures and derivatives. One method, developed by Salk (Proc. Soc. Exp. Biol. Med., 46 (1941), 709, 712) and further studied by Stanley (Science, 101 (1945), 332–335), adsorbed virus from an impure tissue-containing broth by in situ precipitation of calcium phosphate, then separated the virus-containing adsorbate, dissolved the calcium phopshate at around pH 6.5 with aqueous sodium citrate solution, and dialyzed to remove salts.

The present invention is an improvement in the method of Salk, and more particularly in the method for the recovery of the virus materials from the calcium phosphate adsorbate.

It is thus an object of the invention to improve the recovery of virus materials from cultures thereof. Another object is to separate virus materials from proteinaceous contaminants. Another object is to prepare viruses in increased concentration over the levels at which they occur in culture thereof. Another object is to prepare virus vaccines of high potency, high antigenicity, improved stability, and minimal anaphylactic potential. Other objects will be apparent from the following description.

In accordance with the invention, an adsorbate of virus on in situ precipitated calcium phosphate is dispersed in an aqueous solution of ethylenediaminetetraacetic acid (EDTA), pH 7.8–8.3, preferably pH 8.0–8.2, whereby the calcium phosphate in the adsorbate is converted into a complex with the EDTA and is dispersed in the aqueous medium, thereby liberating the virus material. The resulting virus-containing solution is dialyzed against water or preferably against aqueous glycine-sodium chloride solution to reduce the content of phosphate and EDTA as desired, the residual phosphate being useful as a buffering agent, and the residual EDTA serving the important function of stabilizing the virus material. The purified virus-containing solution is further prepared in whatever form is appropriate for its intended use.

In one embodiment of the invention, a formalin-inactivated poliomyelitis vaccine comprising a balanced mixture of the three strains of polio virus at a total concentration of approximately $10^7$–$10^9$ virus particles per milliliter is treated according to the following procedure. To the vaccine is added aqueous 1 M $Na_2HPO_4$ stock solution to a concentration of 0.02 M, followed by aqueous 1 M $CaCl_2$ stock solution to 0.012 M, yielding a precipitate of calcium hydrogen orthophosphate dihydrate. The resulting slurry is stirred for about 10 minutes, then placed in a chill room for 2 hours at about 5° C. The solid phase is separated by centrifugation. The solid thus obtained is dispersed in an about 0.75 M aqueous solution of ethylenediaminetetraacetic acid (pH adjusted to around 7.8–8.3 with conc. NaOH), whereby the solid phase is dissolved and the calcium phosphate-virus adsorbate is caused to dissociate. The resulting virus-containing solution is dialyzed against aqueous 0.25 M glycine–0.75 M sodium chloride solution to reduce the ethylenediaminetetraacetic acid level below about 0.0025 M, calculated to the virus dilution ultimately to be employed for injection.

The "virus material" employed in the present invention can be a virus, an attenuated virus, or an inactivated virus, produced in any of the various ways known to the art. Viruses are conveniently grown in fertile eggs or in monolayer tissue cultures, and are harvested therefrom in aqueous liquids containing egg constituents or tissue culture growth media, as the case may be. The viruses may be attenuated by exposure to radiation or to the controlled action of chemical deactivating agents, or by repeated passage through one or more different types of tissue cultures. Inactivated viruses are commonly obtained by exposing a virus material to the action of formaldehyde or other chemical deactivating agent under conditions effective to prevent further growth of the virus. They may be preserved, both before and after treatment according to the invention, by adding thimerosal thereto to a concentration around 1:20,000.

The process of the invention is broadly applicable to the purification and concentration of viruses, and finds its principal utility in the treatment of pathogenic viruses. Illustrative examples of such viruses include the causative organisms of measles, influenza, parainfluenza, mumps, poliomyelitis, vaccinia, herpes, rabies, canine distemper, equine encephalomyelitis, encephalomyocarditis, hog cholera, foot and mouth disease, certain respiratory disorders (murivirus induced), and the like.

The calcium phopshate adsorption step employed in conjunction with the present invention is carried out by metathetical reaction of suitable precursor salts in situ in the virus-containing liquid; e.g., by the reaction of calcium chloride, calcium nitrate, calcium acetate, or the like with the sodium orthophosphates, potassium orthophosphates, or the like. It is convenient to add the precursor salts in the form of stock solutions of 1 M concentration, and it is found that the relative proportions should be adjusted to produce a final pH in the range of about 7 to 8. For the various types of viruses, the optimum proportion of reactants tends to vary, the following being exemplary:

| Virus Material | Type | Source | Conc. $Na_2HPO_4$ (M) | Conc. $CaCl_2$ (M) |
|---|---|---|---|---|
| Polio virus | I | Tissue culture | 0.02 | 0.012 |
|  | II | do | 0.02 | 0.012 |
|  | III | do | 0.01 | 0.015 |
| Polio vaccine, inactivated | Tri | do | 0.01 | 0.015 |
| Influenza vaccine | A2 | Embryonated eggs | 0.015 | 0.015 |
| Parainfluenza vaccine | HA-2 | Tissue culture | 0.01 | 0.015 |
| Mumps vaccine |  | Embryonated eggs | 0.015 | 0.015 |
| Measels vaccine |  | Tissue culture | 0.01 | 0.015 |

The disproportionation of the virus-calcium phosphate adsorbate in accordance with the present invention is carried out with an aqueous solution of ethylenediaminetetraacetic acid (EDTA, edathamil, edetic acid) of a concentration between about 0.1 M and about 1 M and a pH between 7.8 and 8.3, higher concentrations being effective to give higher concentrations of virus, and the optimum pH level being between 8.0 and 8.2. The EDTA is conveniently employed in the form of the sodium, potassium, ammonium, or other nontoxic water-soluble salt, the ratio of cation to anion being adjusted to produce a pH of the desired level. The quantity of EDTA solution can vary considerably, according to the amount of calcium phosphate to be dissolved, but generally runs from about 10 to about 50 ml. per liter of the original virus-containing liquid. Obviously, the smaller the amount of EDTA solution employed, the more concentrated will be the resulting virus solution.

The purified virus-containing liquid obtained in accordance with the present invention is optionally adsorbed upon an adjuvant solid having pharmaceutically acceptable properties upon injection, the proportion of solid being preferably sufficient to adsorb substantially all of the antigenic virus therefrom. The virus is further concentrated in this way and is greatly increased in antigenicity. A preferred solid is hydrated aluminum phosphate, used in a proportion between about 0.5 and about 5 milligrams per milliliter or somewhat higher, according to the virus concentration. The resulting adsorbed vaccine can be used as such, or can be sedimented and decanted to yield a product of further increased potency. The vaccine, whether thus treated or not, can be further treated in a known manner to improve its stability by addition of sodium bisulfite, sodium sulfamate, glycine, protein hydrolyzates, or the like, or in general any substance which contains an aldehyde-reactive amino radical or an aldehyde-reactive sulfite radical. The material is finally subjected to the usual tests for antigenicity, contamination, and identity, and is dispensed into ampoules or vaccine bottles for storage and distribution.

The invention will be more fully understood from the following operating examples, which are submitted as illustrative only and not by way of limitation.

*Example 1*

The following procedure illustrates the concentration of a trivalent poliomyelitis vaccine, prepared by cultivation of the individual viruses in monkey kidney cell tissue culture, followed by inactivation with formaldehyde according to the Salk procedure, and pooling in equipotent proportion to produce a trivalent vaccine containing around $10^8$ polio virus particles per milliliter. In the example, the following assay procedures were used. Polio virus activity assays were done using primary monkey kidney cells, or in some cases $MK_2$ cells in a plaque system, substantially equivalent results being obtained by both methods. Protein assays were carried out by the method of Lowry et al., J. Biol. Chem., 193 (November 1951), page 256, or by semimicro Kjeldahl, the results again being comparable.

To 18 liters of the trivalent poliomyelitis vaccine contained in a 5-gallon bottle were added, with constant stirring, 180 ml. of 1 M dibasic sodium phosphate solution, followed by 270 ml. of 1 M calcium chloride solution. Stirring was continued thereafter for 20 minutes at a sufficient intensity to keep the precipitate of calcium orthophosphate dihydrate in suspension. The resulting slurry was placed in a chill room at approximately 5° C. for 24 hours to allow the precipitate to settle. The supernatant fluid was then withdrawn and discarded. The precipitates from 3 bottles were pooled in a 12-gallon bottle and slurried therein with around 10 gallons of distilled water, then allowed to settle for 48 hours. The supernatant fluid was withdrawn and discarded. To the solids were slowly added approximately 360 ml. of aqueous 0.75 M ethylenediaminetetraacetic acid, pH 8.0 (sodium hydroxide), with rapid stirring, the precipitate being dissolved thereby. To the concentrated fluid vaccine obtained in this way was added polysorbitan monooleate, 20 mcg./ml., and the mixture was then dialyzed for approximately 72 hours against an aqueous solution of glycine (0.25 M), sodium chloride (0.75 M), and polysorbitan monooleate (20 mcg./ml.) to remove the calcium-ethylenediaminetetraacetic acid complex, dialysis being continued until the ethylenediaminetetraacetic acid concentration had reached a level equivalent to about 0.0125 M upon dilution of the vaccine for injection.

The results of the above procedure were as follows:

| | Concentration | Dose, ml. | Monkey Potency* | | |
|---|---|---|---|---|---|
| | | | Type I | Type II | Type III |
| Original Vaccine | 1X | 1.0 | 0.96 | 1.65 | 1.97 |
| Concentrate | 2X | 0.5 | 1.58 | 1.35 | 2.72 |

*Ratio to antigenicity of NIH reference vaccine.

*Example 2*

A batch of type I inactivated poliomyelitis vaccine was subjected to purification generally according to the procedure of Example 1, and was found to be increased in virus concentration by a factor of approximately 12.9:1. The concentrated vaccine was found to have undergone a purification of 80 percent, as indicated by its decrease in protein nitrogen assay. Furthermore, it was found to have improved greatly in stability, having a chick potency of 1:43 after 42 days at 37° C., compared with a complete loss of activity in an untreated control sample subjected to the same stability test conditions.

*Example 3*

A 400-liter batch of formalin-inactivated trivalent poliomyelitis vaccine, prepared from monkey kidney cell tissue culture virus, was concentrated and purified according to the following procedure. The vaccine, contained in a 400-liter tank (rated capacity) equipped with stirrer, was cooled to about 5° C., and to it were added successively, with constant stirring, sufficient quantities of aqueous 1 M sodium dihydrogen phosphate solution and aqueous 1 M calcium chloride solution to produce a 0.015 M final concentration of each salt. Stirring was continued for one hour at 5° C., and the mixture was then allowed to stand at about 5° C. for 2 hours. The precipitate was removed by centrifuging and dissolved in 7 liters of 0.741 M EDTA solution, pH 8.0, after which polysorbitan monooleate was added to a concentration of 20 mcg./ml. The solution was dialyzed at 5° C. for 72 hours against an aqueous solution containing 0.25 M glycine, 0.75 M sodium chloride, and 20 mcg./ml. polysorbitan monooleate, whereby the EDTA concentration was reduced to approximately 0.006 M. The product contained approximately $10^9$ virus particles per milliliter.

*Example 4*

Influenza virus vaccine, strain Jap. 305, grown in embryonated eggs, concentrated 10× by centrifuging, and inactivated with formalin according to conventional procedure, was further concentrated and purified according to the procedure and essentially under the conditions of Example 3. The calcium phosphate precipitate containing the adsorbed vaccine was dissolved in 0.741 M EDTA solution, pH 8.0, employed in the proportion of 35 ml. of solution per liter of the original concentrated vaccine.

The original vaccine, after inactivation, had a chick cell agglutinin (CCA) titer of 822 CCA units per milliliter. By means of the above treatment, it was further concentrated 10×, and was found to have a titer of 12,460 CCA units per milliliter. The inactivated vaccine originally contained 118 mcg. of protein per 100 CCA units; after treatment, it had 94 mcg. per 100 units.

The treated vaccine was further concentrated and purified by centrifuging through a Charples T–1P virus centrifuge at a flow rate of 550 ml./hr. and 50,000 r.p.m. The solids were removed and resuspended in aqueous 0.05 M glycine and 0.15 sodium chloride solution to a final concentration of 20× above the original 10×. The treated product contained 60 mcg. of protein per 100 CCA units.

*Example 5*

Parainfluenza virus, types 1, 2, and 3, grown in Primary Green Monkey tissue culture, and having an infectivity titer of 4.74 (expressed as the negative logarithm of the dilution to $TCID_{50}$), was successfully concentrated and purified according to the procedure and essentially under the conditions of Example 1. The treated virus, after dialysis, was found to have been concentrated by a factor of 7.3× and to have an infectivity titer of 7.0.

*Example 6*

Mumps virus, Habel strain, grown in embryonated eggs and inactivated with formalin, was concentrated and purified according to the procedure of Example 1. The inactivated vaccine originally had a hemagglutination titer of 1:512; after being treated, the concentration of the virus was 10×, and a 1:10 dilution had a titer of 1:512. The inactivated vaccine originally contained 6 mg. of protein per milliliter; after being treated, the 10× concentrate contained 10.42 mg. per milliliter.

*Example 7*

Live measles virus, grown in primary chick embryo cells, was successfully concentrated and purified according to the procedure and essentially under the conditions of Example 1. The original virus had an infectivity titer of 2.63, while the treated virus, having a 10× concentration, had a titer of 3.44.

*Example 8*

Murivirus, grown in Primary Green Monkey kidney tissue culture, was successfully concentrated and purified according to the procedure and essentially under the conditions of Example 1. The original virus had an infectivity titer of 5.2; after treatment, it had a concentration of 6× and an infectivity titer of 5.62.

While the invention has been described by reference to certain specific materials, operations, and conditions, it is to be understood that numerous modifications and variants thereof will occur to those skilled in the art which do not depart from the spirit of the invention. Such modifications and variants are to be considered as lying within the scope of the invention, as defined by the following claims.

I claim:

1. In a method for the purification and concentration of an impure virus preparation containing proteinaceous impurities, which method includes the steps of contacting said impure virus preparation in an aqueous medium with in situ precipitated calcium phosphate under conditions effective to selectively adsorb said virus thereon while substantially rejecting the impurities, and recovering said virus from the resulting adsorbate in substantially purified and concentrated form, the improved method for said recovery which comprises contacting said adsorbate with an aqueous solution of ethylenediaminetetraacetic acid of pH 7.8–8.3, whereby the calcium phosphate in said adsorbate is converted into a complex with said ethylenediaminetetraacetic acid and is dispersed in said solution, and whereby said virus is released from said adsorbate.

2. The method of claim 1 wherein said impure virus preparation is an inactivated polyvalent poliomyelitis vaccine.

3. The method of claim 1 wherein said impure virus preparation is an attenuated polyvalent poliomyelitis vaccine.

4. The method of claim 1 wherein said impure virus preparation is an inactivated influenza vaccine.

5. The method of claim 1 wherein said impure virus preparation is an inactivated measles vaccine.

6. The method of claim 1 wherein said impure virus preparation is an attenuated measles vaccine.

7. In a method for the purification and concentration of an impure virus preparation containing proteinaceous impurities, which method includes the steps of contacting said impure virus preparation in an aqueous medium with in situ precipitated calcium phosphate under conditions effective to selectively adsorb said virus thereon while substantially rejecting the impurities, and recovering said virus from the resulting adsorbate in substantially purified and concentrated form, the improved method for said recovery which comprises contacting said adsorbate with an aqueous solution of ethylenediaminetetraacetic acid of pH 8.0–8.2, whereby the calcium phosphate in said adsorbate is converted into a complex with said ethylenediaminetetraacetic acid and is dispersed in said solution, and whereby said virus is released from said adsorbate.

8. In a method for the purification and concentration of an impure virus preparation containing proteinaceous impurities, which method includes the steps of contacting said impure virus preparation in an aqueous medium with in situ precipitated calcium phosphate under conditions effective to selectively adsorb said virus thereon while substantially rejecting the impurities, and recovering said virus from the resulting adsorbate in substantially purified and concentrated form, the improved method for said recovery which comprises commingling said adsorbate with an aqueous solution of ethylenediaminetetraacetic acid of pH 7.8–8.3, whereby the calcium phosphate in said adsorbate is converted into a complex with said ethylenediaminetetraacetic acid and is dispersed in said solution, and whereby said virus is released from said adsorbate, and dialyzing said complex at least in part from said solution.

9. In a method for the purification and concentration of an impure virus preparation containing proteinaceous impurities, which method includes the steps of contacting said impure virus preparation in an aqueous medium with in situ precipitated calcium phosphate under conditions effective to selectively adsorb said virus thereon while substantially rejecting the impurities, and recovering said virus from the resulting adsorbate in substantially purified and concentrated form, the improved method for said recovery which comprises commingling said adsorbate with an aqueous solution of ethylenediaminetetraacetic acid of pH 7.8–8.3, whereby the calcium phosphate in said adsorbate is converted into a complex with said ethylenediaminetetraacetic acid and is dispersed in said solution, and whereby said virus is released from said adsorbate, and dialyzing said complex at least in part from said solution with aqueous glycine-sodium chloride solution.

10. In a method for the purification and concentration of an impure virus preparation containing proteinaceous impurities, which method includes the steps of contacting said impure virus preparation in an aqueous medium with in situ precipitated calcium phosphate under conditions effective to selectively adsorb said virus thereon while substantially rejecting the impurities, and recovering said virus from the resulting adsorbate in substantially purified and concentrated form, the improved method for said recovery which comprises commingling said adsorbate with an aqueous solution of ethylenediaminetetraacetic acid of pH 7.8–8.3, wherby the calcium phosphate in said adsorbate is converted into a complex with said ethylenediaminetetraacetic acid and is dispersed in said solution, and whereby said virus is released from said adsorbate, adding to the resulting solution a stabilizing proportion of polysorbitan monooleate, and dialyzing said complex at least in part from said solution with aqueous glycine-sodium chloride solution containing a stabilizing proportion of polysorbitan monooleate.

References Cited by the Examiner

UNITED STATES PATENTS 3,132,073 5/1964 MacFarlane et al. ----- 167—78

LEWIS GOTTS, *Primary Examiner.*

RICHARD L. HUFF, *Assistant Examiner.*